R. DE GRAFF.
METHOD FOR RECOVERING SUNKEN VESSELS.
APPLICATION FILED JAN. 29, 1919.
1,368,787.
Patented Feb. 15, 1921.
2 SHEETS—SHEET 1.
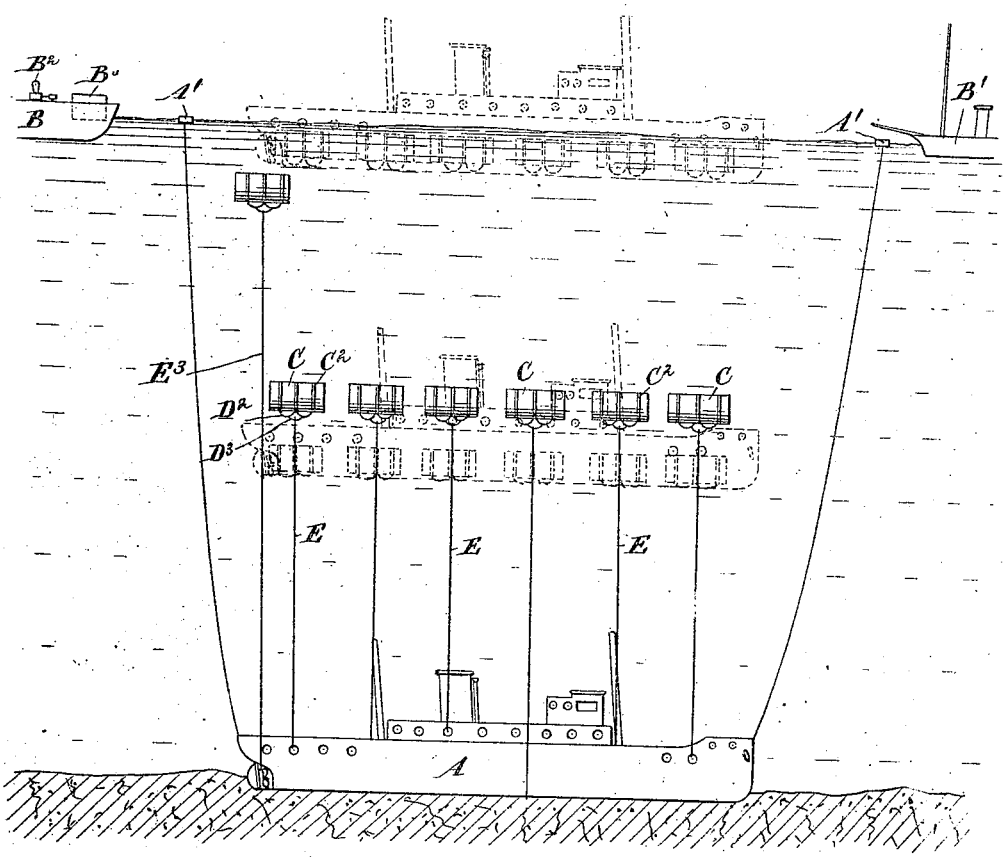
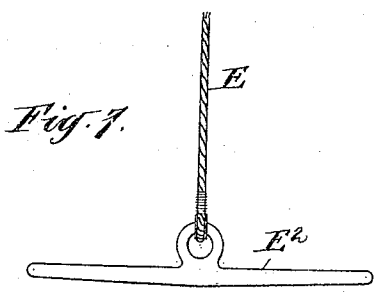
INVENTOR
Rudi de Graff.
BY
Charles R. Searle.
ATTORNEY R. DE GRAFF.
METHOD FOR RECOVERING SUNKEN VESSELS.
APPLICATION FILED JAN. 29, 1919.
1,368,787.
Patented Feb. 15, 1921.
2 SHEETS—SHEET 2.
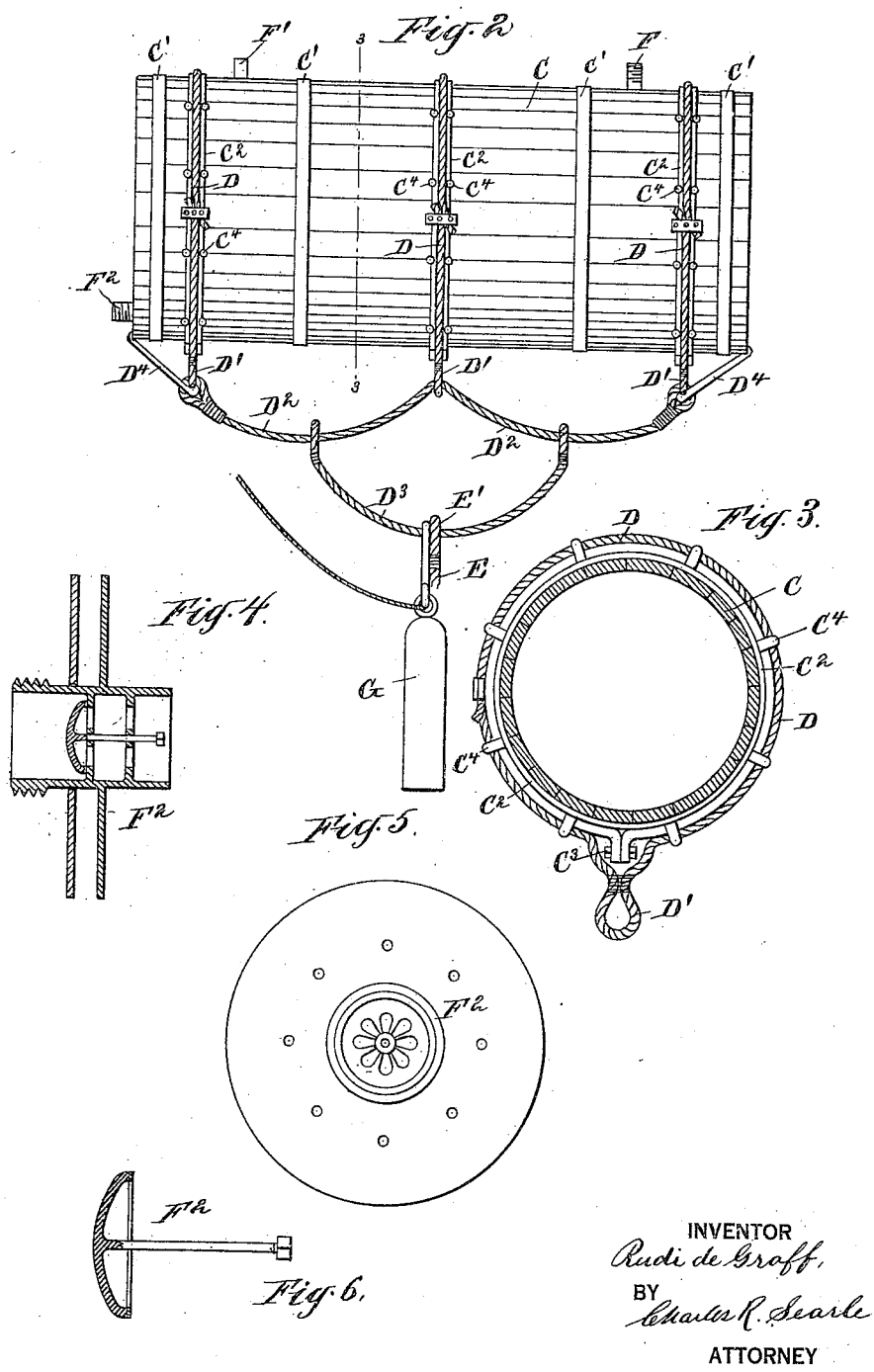
INVENTOR
Rudi de Graff,
BY
Charles R. Searle
ATTORNEY

UNITED STATES PATENT OFFICE.

RUDI DE GRAFF, OF NEW YORK, N. Y., ASSIGNOR TO ATALANTA ENGINEERING CORPORATION, OF NEW YORK, N. Y., A CORPORATION OF DELAWARE.

METHOD FOR RECOVERING SUNKEN VESSELS.

1,368,787.  Specification of Letters Patent.  Patented Feb. 15, 1921.

Application filed January 29, 1919. Serial No. 273,720.

*To all whom it may concern:*

Be it known that I, RUDI DE GRAFF, a citizen of the Republic of Russia, residing in the city of New York, borough of Manhattan, in the county and State of New York, have invented a certain new and useful Improvement in Methods for Recovering Sunken Vessels, of which the following is a specification.

The invention relates to salvaging operations in which the wreck to be recovered is raised from the bottom by floats or pontoons, and the main object of the invention is to provide a method whereby operations of this character may be successfully accomplished, particularly at depths usually considered prohibitive, with marked efficiency and economy in labor, equipment and time.

The invention consists of certain mechanical appliances and the manner of using the same, by which the above objects are attained, to be hereinafter described and claimed.

The accompanying drawings form a part of this specification and show the means employed and the manner of using them.

Figure 1 is a general side elevation showing the vessel to be raised and portions of the equipment; the dotted lines show successive steps in the lifting operation;

The succeeding figures are on a larger scale and show parts of the apparatus.

Fig. 2 is a side elevation of one of the pontoons or floats;

Fig. 3 is a transverse section of the same taken on the line 3—3 in Fig. 2, and partly in elevation;

Fig. 4 is a section showing one of the valves and its seat on a still larger scale;

Fig. 5 is a corresponding plan view of the valve-seat with the valve removed;

Fig. 6 is an elevation of the valve alone, partly in section;

Fig. 7 is an elevation showing a grapple or shackle-bar by which the lifting cables may be secured to the wreck.

Similar letters of reference indicate the same parts in all the figures.

The method briefly stated is as follows:

After the sunken vessel has been located by soundings and grappling and its position determined, cables or chains are attached at a plurality of points and a pontoon or tank of moderate lifting capacity is filled with water, submerged, and attached to each cable at a point say fifty feet below the surface; the pontoons are then pumped out and the vessel thus raised fifty feet off the bottom, in which position it is towed to shallower water. An extra or idle pontoon is filled, lowered, and attached to one of the cables at a point fifty feet below its floating pontoon; the latter is then detached, filled, lowered, and attached to a second cable, thus freeing a third pontoon which is similarly transferred and so on until all the cables are supplied. The pontoons are again pumped out one at a time and the vessel thus lifted another fifty feet. The operation is repeated until the vessel reaches a point fifty feet below the surface, then the pontoons are placed alongside the wreck as low as possible, each pontoon connected with the corresponding one, on the other side of the wreck, the connecting chains or cables passing underneath the wreck; then the pontoons are pumped out and the wreck will appear awash or sufficiently exposed to permit temporary repairs to be made and the vessel pumped out and floated either alone or partially supported by the same or other pontoons and towed to the dock for complete repairs.

Details of this method and the mechanisms employed will appear in the following full description.

A is the vessel to be raised shown as resting on the bottom on an even keel in deep water, with the bow and stern marked by surface buoys A'. B is a barge carrying the pontoons, cables, pumps, compressed air reservior and other required appliances, anchored in the immediate vicinity of the wreck and B' is a companion vessel or yacht from which the divers may operate free from the danger of entanglement with the cables and pipes from the barge B.

The pontoons C are tanks having staves and heads of wood and are carried to the wreck on the barge B in the "knocked-down" condition and assembled as required, thus saving space in transportation and avoiding the dangers incident to towing in the assembled condition. In addition to the usual hoops C' each pontoon is equipped with three strong bands $C^2$ of iron clamped at the ends on the under side of the pontoon by bolts $C^3$ extending through outwardly turned lugs, and each band carries a series of open rings or U-guides $C^4$ through which passes a circumferential cable D having a loop D' depending on the under side of the pontoon. The pontoons are of a size or displacement to provide a moderate lifting force when empty, preferably about thirty tons each, so that singly none can exert a lifting or breaking force greater than can be successfully resisted by the fixed portions of the vessel, as portholes, hatch coamings and other convenient points of attachment for the lifting cables. It is preferable to accomplish the lifting by a multiplicity of such relatively small pontoons for the reason that such convenient points of attachment are generally available while it is usually very difficult to find points of attachment sufficiently strong to withstand the pull of large pontoons without tearing loose. $D^2$ is a bridle or short length of cable passed loosely through the central loop D' and secured at its ends to the outer loops D' having sufficient slack to form depending curves, and $D^3$ is a shorter cable having an eye at each end inclosing the bridle $D^2$ at one of such curves and carries in its bight the running eye E' of the lifting cable E. The purpose of the bridle $D^2$ and equalizing cable $D^3$ is to insure an equal distribution of the load to all parts of the pontoon in case the latter should not lie in a horizontal position. The ends of the bridle $D^2$ carry hooks $D^4$ extending angularly to and engaged with the heads or chimes of the pontoon to resist longitudinal strains on the ends of the bridle and transfer them directly to the pontoon instead of indirectly through the circumferential cables D.

Each pontoon has an inwardly opening air-inlet nozzle F equipped with an inwardly opening air-valve, not shown, and an automatic relief valve at F' on the upper side, and a suction valve $F^2$ at a low point in one of its heads. The casing of the suction valve $F^2$ is adapted to receive the coupling of a suction hose, not shown from a hydraulic pump $B^2$ on the barge B. The relief valve F' is similar to the suction valve $F^2$ but is not designed to receive a hose and is, in effect, an outwardly opening check-valve. The air inlet nozzle F is arranged to receive an air hose, not shown, from a reservoir $B^3$ of compressed air on the barge B, and is in effect an inwardly opening check-valve.

The pontoon having been assembled on the deck of the barge, is lowered overboard and filled with water through the valves F' and $F^2$, and temporarily weighted, as at G, see Fig. 2, sufficiently to sink slowly, it is lowered to a predetermined depth stated above as fifty feet, and the bight of its equalizing cable $D^3$ is engaged by the diver with one of the lifting cables E. After the pontoon is thus positioned the temporary weights G are hauled up to the barge and another pontoon is similarly lowered and attached to its companion cable E, and so on until all the lifting cables E are supplied.

As the pontoons are of wood and therefore of less gravity than the water, they exert a slight upward pull sufficient to hold the lifting cables taut and avoid interference one with another. The suction hose, not shown, from the pump $B^2$ is then attached by the diver to the valve casing of the suction valve $F^2$ and the airhose, not shown, from the compressed air tank $B^3$ is attached to the air-inlet nozzle F. As the pump cannot operate successfully in lifting the water through the height of fifty feet, it is necessary to force the water through part of the distance by air-pressure. An air pressure equal to the water pressure at that depth will supply the additional force required to drive the water to the point at which the pump will work—and by maintaining this pressure the pontoon may be emptied and exert its full lifting force while the internal and external pressures will be equal or so nearly equal as to avoid danger of either bursting or collapse, and as the pontoon rises toward the surface in the lifting operation the relief valve F' will automatically open, due to the lessening of external pressure, and thus maintain the approximate equality of inner and outer pressures. This arrangement permits the use of pontoons having only such strength as is required in resisting such small differences in pressure.

The diver attaches the lifting cables to the wreck on each side as nearly as may be in opposite pairs, and by reason of the light pull exerted by each pontoon individually, he may attach to any convenient portion of the vessel. The cable may carry a shackle-bar $E^2$ adapted to be thrust through and crossed to engage a porthole, coal plate hole or other opening, or may be equipped with hooks, not shown, by which a hitch may be taken around a cleat, stanchion, winch, or the like, or passed beneath the wreck and engaged with the hook on its opposite companion cable.

The pairs of cables are preferably attached first at the bow and stern, then at about the midlength, and the others then attached alternately forward and aft from the midlength to support first the heavy portion of the vessel containing the engines and boilers, and thus distribute the lifting pull without overstraining any portion of the vessel.

The pontoons are preferably pumped out in substantially the same order.

The extra pair of pontoons mentioned above may also serve in initiating the movement of the wreck from its bed; when thus employed they are attached by cables $E^3$ to the stern and sunk only a short distance, as for example, fifteen feet, and on being pumped out, exert an additional lifting force at that portion of the vessel, tending to raise that end and thus loosen the wreck from the grip of the sand. This initial lifting will cease when the extra pontoons reach the surface.

After each fifty foot lift the vessel and pontoons are towed to shallower water until the vessel is sufficiently exposed to permit temporary patching.

By limiting the lifting movements to short distances, described as fifty feet, the work of attaching and detaching hose and other operations on the pontoons may be performed by divers in ordinary diving suits, instead of the heavily armored suits necessary in attaching the lifting cables to the vessel and performing other work on the bottom.

It is extremely difficult and hazardous for a diver to work at great depths and he must be protected by a heavy armor which adds greatly to the difficulty of working by reason of its cumbrousness. So in this system the diver makes but the one descent in the heavy suit, and attaches the bars or shackles of the cables to portholes, stanchions, and other accessible and not particularly strong portions of the wreck, but attaches a large number. He could hardly in such depths and thus armored connect pontoons directly to the wreck nor make the hose connections, etc., and moreover, it would be difficult to pump out and supply air at such depths. Having attached the cables, which may be buoyed, the deep diving is finished; all the subsequent operations may be done in ordinary diving dress and under favorable conditions and pressures. The measure "50 feet" mentioned is purely arbitrary; it may be more or less; what is meant is a depth at which the diver can work comfortably in the usual diving suit.

Any suitable rope-clamp may be used in connecting the bridles of the pontoons to the cables.

I claim:—

1. The cylindrical pontoon described having staves, heads, and hoops, a circumferential band near each end and at the middle, means for tightening said bands, open guides on said bands, a circumferential cable received in said guides on each band, and having an eye on the under side, a bridle secured at its ends to the eyes in such end cables and extending loosely through the eye of such middle cable, and an equalizing cable slidably engaged at its ends with said bridle on opposite sides of said middle band.

2. The cylindrical pontoon described having staves, heads, and hoops, a circumferential band near each end and at the middle, means for tightening said bands, open guides on said bands, a circumferential cable received in said guides on each band, and having an eye on the under side, a bridle secured at its ends to the eyes in such end cables and extending loosely through the eye of the middle cable, and an equalizing cable slidably engaged at its ends with said bridle on opposite sides of said middle band, and a hook at each end of said bridle in engagement with the ends of said pontoon.

3. A pontoon, end and intermediate cables embracing the same, a bridle joining the end cables and loosely connected with the intermediate cable, and an equalizing cable having its ends loosely receiving the bridle upon opposite sides of the intermediate cable.

4. A pontoon, end and intermediate cables embracing the same, a bridle joining the end cables and loosely connected with the intermediate cable, an equalizing cable having its ends loosely receiving the bridle upon opposite sides of the intermediate cable, and guiding means for said end and intermediate cables, said means embracing the pontoon.

5. A pontoon, end and intermediate cables embracing the same, a bridle joining the end cables and loosely connected with the intermediate cable, an equalizing cable having its ends loosely receiving the bridle upon opposite sides of the intermediate cable, guiding means for said end and intermediate cables, said means embracing the pontoon, and means connected with the bridle and engaging the ends of the pontoon to resist longitudinal strains on the ends of the bridle.

In testimony that I claim the invention above set forth I affix my signature.

RUDI DE GRAFF.